2,980,656
METHOD FOR PRODUCTION OF SOLUBLE CHLORINATED POLYMERS

Rufus V. Jones and Peter J. Canterino, Bartlesville, Okla., assignors to Phillips Petroleum Company, a corporation of Delaware No Drawing. Filed Aug. 30, 1954, Ser. No. 453,121

9 Claims. (Cl. 260—85.1)

This invention relates to a novel process for the catalytic chlorination of butadiene polymers. More particularly, it relates to a novel process for the production of chlorinated butadiene polymers which are thermoplastic, not cross-linked, and soluble in such conventional organic solvents as chlorinated hydrocarbons, dioxane, acetone, etc.

The chlorination of rubber has been the subject of extensive investigation. Addition of chlorine to the double bonds present in rubber takes place easily, as it does with ordinary olefins. However, the chlorination of rubber is more complex in that several side reactions take place. The most likely side reactions are cyclization and cross-linking. In chlorinating natural rubber the chief side reaction is cyclization. As chlorination progresses the rubber cyclizes but does not bring about cross-linking. At a chlorine content of about 50 percent the rubber precipitates out of carbon tetrachloride (this product is still soluble in benzene, showing that no cross-linking is taking place). On further chlorination it once again dissolves in the carbon tetrachloride solution. In order to continue the chlorination after all the double bonds are saturated various catalysts have been used. There are numerous references in the literature to such catalysts as organic perioxides, ultra-violet radiation, antimony oxychloride, iodine, stannic chloride and phosphorus pentachloride for obtaining more rapid chlorination and higher chlorine content after saturation of the double bonds.

When synthetic polymers became available attempts were made to chlorinate these, using the same procedure which had been employed to chlorinate natural rubber. It was found that an unsatisfactory product resulted. The product would gel and precipitate out of the carbon tetrachloride solution, and (unlike natural rubber) on further chlorination would fail to redissolve. It was found that the precipitated polymer was cross-linked through some side reaction which gelled the polymer, rendering it insoluble in all solvents. Such a product was worthless for many uses.

Various attempts have been made in the past to circumvent this cross-linking or gelation; however, none of these made it possible to use the same conditions and solvent used in the chlorination of natural rubber i.e., to take advantage of the excellent properties of carbon tetrachloride as a chlorinating solvent and the ease of recovery of the product.

In order to produce a more desirable product, various expedients have been tried by others. The prior art discloses, for example, the chlorination of synthetic polymers using phosphorus pentachloride as the chlorinating agent. While the product of this process remains in solution at the completion of the reaction, it does not redissolve once it is isolated from solution and dried. Insoluble and cross-linked chlorination products of this type are of limited utility.

It is, accordingly, an object of the present invention to provide a process for the chlorination of butadiene polymers to produce a non-cross-linked chlorinated polymer. A more specific object is the provision of a method of chlorination of butadiene polymers to obtain a product which is soluble in organic solvents and thermoplastic, thus rendering it useful as an ingredient for paints, lacquers, etc., as well as for the fabrication of molded articles. Another object is to provide such a chlorination process employing a solvent which is resistant to chlorination and easily removable from the chlorinated product, so that the disadvantages attending the use of solvents ordinarily employed for this purpose are avoided. A further object is to provide such a chlorination process employing a phosphorus halide catalyst. A further object is the provision of novel chlorinated rubbery compositions, including not only chlorinated polymers per se but also blends of chlorinated polymers with other polymers, either chlorinated or unchlorinated.

We have now discovered that if rubbery polymers of butadiene are chlorinated with elemental chlorine in the presence of a phosphorus polyhalide catalyst such as phosphorus trichloride or phosphorus pentachloride, the products obtained are not only thermoplastic, but because they are not cross-linked are also soluble in organic solvents, rendering them useful as ingredients for paints, lacquers and the like as well as for the fabrication of molded articles. According to our novel process, butadiene polymer is dissolved in carbon tetrachloride, and a minor amount of phosphorus trichloride or phosphorus pentachloride is then dissolved in the reaction mixture. Chlorine is then added by suitable means such as by passing gaseous chlorine into the reaction mixture or by adding chlorine dissolved in a suitable solvent, such as that used to dissolve the polymer and form the reaction medium. Chlorination of unsaturated linkages is effected rapidly after which the chlorination mechanism is one of substitution which proceeds more slowly. After the completion of the desired degree of chlorine addition, various methods are available for recovering the product, e.g., by coagulation with an alcohol or by other suitable coagulating agent, followed by washing and drying of the separated coagulum.

The solvent used in this process, carbon tetrachloride ($CCl_4$), is cheap and cannot be chlorinated further. By contrast such solvents as ethylene dichloride, chloroform, tri-, tetra-, and pentachloroethane, benzene, etc., are more expensive and are susceptible to chlorination, hence they will consume a certain amount of chlorine during the process. Not only does this result in a loss of chlorine to the solvent, but also the chlorinated solvent may solidify during the process, e.g., 1,4-dichlorobenzene solidifies at 53° C. which is above our preferred temperature range. In addition, many of the solvents are difficultly removable from the chlorinated product, specially when chlorinated in the process. By contrast, $CCl_4$ is easily separated from the chlorinated product because it has a low solubility in $H_2O$ and a relatively low boiling point. For example, the $CCl_4$ can be removed simply by adding the reaction mixture to boiling water, the polymer being gathered from the surface and the vaporized $CCl_4$ condensed for reuse. A sufficient amount of $CCl_4$ solvent is employed to dissolve the unsaturated polymeric starting material and preferably an excess is employed. By so operating, a mobile reaction mixture will be provided and agitation of the mixture and contact of reactants will be facilitated. We have generally employed from 20–50 parts by weight of solvent per part of polymer although greater amounts can be used if desired, the consistency of the mixture being adjusted to what the equipment at hand will handle. For example, one may employ lesser amounts of solvent with a resultant more viscous reaction mixture. Very viscous mixtures can be chlorinated in a Banbury mixer, adding chlorine either as a gas or as a solution in carbon tetrachloride.

Phosphorus trichloride and phosphorus pentachloride can be considered as halogenation modifiers in that they modify the properties of the chlorinated polymers, specifically, by avoiding cross-linking therein. At the same time the phosphorus halides may be considered as catalysts in that they direct the chlorination so as to yield a non-cross-linked product which does not contain the phosphorus halide combined with the polymer. For convenience the phosphorus halides will be referred to throughout the remainder of the specificaiton as catalysts. The amount of said catalysts used will be in the range from 2–25 weight percent based on the weight of the polymeric starting material. At and below 1 percent, phosphorus trichloride does not give a completely soluble product; hence, about 2 percent is a definite lower limit. The catalyst can be added to the reaction mixture in undiluted form or, if desired, can first be dissolved in a solvent such as that employed for the reaction and the solution so formed can then be added to the reaction mixture. When the catalyst is added to the reaction mixture in undiluted form, the reaction mixture is stirred until the catalyst is dissolved prior to introduction of chlorine.

Addition of chlorine can be effected by passing the gas into the reaction mixture with agitation to provide complete contacting, or chlorine can be dissolved in a solvent such as that used to dissolve the polymer and added to the reaction mixture. If desired, a portion of the chlorine can be added as a solution in a suitable solvent and then the remainder can be added as gas or vice versa. In the case of polybutadiene the theoretical required is about 1.31 parts of chlorine per part of polymer to saturate the double bonds. The use of 1.5 or more parts by weight of chlorine per part by weight of polymer will insure the complete chlorination of the unsaturated linkages in polybutadiene. When employing partially hydrogenated starting materials, which are further described hereinbelow, the quantity of chlorine can be reduced in proportion to the reduced unsaturation. If chlorination higher than that produced by saturation of the double bonds is desired, a correspondingly greater amount of chlorine will be employed.

Reaction temperatures will be in the range of 5°–80° C., preferably from about 10°–30° C. The chlorination reaction is exothermic and the reaction mixture is maintained within the temperature range set forth by suitable cooling means. Atmospheric pressure operation is satisfactory for the present process but elevated pressures can be employed if desired. When operating with a reaction temperature at or near the atmospheric boiling point of the solvent employed, it is desirable to employ superatmospheric pressure or a suitable reflux means to prevent loss of said solvent.

The reaction of the present invention is conducted under anhydrous conditions to avoid hydrolysis of the phosphorus halide. After the polymeric starting material is dissolved in the solvent, and prior to the addition of the catalyst, traces of moisture, if present, can be removed by distilling a portion of the solvent and water as azeotrope.

Reaction time depends on whether one is chlorinating unsaturated linkages or substituting chlorine for hydrogen. In the former case the reaction time is normally determined by the time required for the addition of the chlorine to the reaction mixture since on contact with elemental chlorine the chlorination of unsaturated linkages is substantially instantaneous. But when the chlorination has proceeded to the point of saturation of these linkages the reaction then becomes one of substitution which is considerably slower than addition. In fact at this point (about 52 percent chlorine content in the case of polybutadiene) it is often desirable to employ an auxiliary catalyst such as ultra-violet light, iodine, antimony oxychloride, stannic chloride, benzoyl peroxide, or the like to expedite the substitution reaction. By this method products containing 75 percent or more chlorine can be prepared.

The chlorinated product can be easily separated from the reaction medium in one of several ways. The isolation may be effected by pouring the solution into hot water in sufficient quantity and of sufficiently high temperature to evaporate the $CCl_4$. This brings the product to the surface where it can be separated from the water. Or the solution can be continuously applied in a thin stream to heated rollers thereby evaporating the solvent and isolating the product in solid state. Another method consists of pouring the reaction solution into an alcohol, e.g., isopropanol, wherein the chlorinated polymer coagulates, followed by separation of the coagulum from the liquid. Following its isolation the product is washed and dried. Simple water washing is sufficient to remove the phosphorus halide from the product. If isolation is made in hot water the phosphorus halide will be removed in this step.

The polymers applicable for chlorination according to the process of the present invention are limited to those which when chlorinated by conventional means form cross-linked polymers which either precipitate from the reaction solution or, if they remain in solution at the completion of the reaction, cannot be redissolved once they are separated from the reaction solution and dried. More specifically, the polymers to be chlorinated according to the present invention are limited to rubbery polybutadiene and rubbery copolymers of butadiene. By the term "rubbery" we mean that the polymer has a Mooney value of 5 or above, which excludes liquid polymers. The latter are excluded because they do not present the chlorination problem to be solved here, that of obtaining soluble products from chlorination in carbon tetrachloride. Natural rubber and neoprene are excluded for the same reason. The latices are inoperative because they form an insoluble cross-linked polymer when chlorinated according to the instant process. And, of course, the catalyst, phosphorus halide, would immediately be destroyed in a latex by reaction with the water phase. As a practical matter one would exclude from this process any polymers to be chlorinated to less than 15 percent by weight chlorine since up to this point conventional methods of chlorination can be employed and a soluble product secured; the likelihood of gelling begins at about 15 percent chlorine in the polymer and it is above this point that the process of this invention becomes necessary. Copolymers of butadienes with isoprene, chloroprene, dimethylbutadiene, styrene, and alpha-methyl styrene are operable. The preferred copolymer is a butadiene-styrene copolymer. An example of this is a copolymer prepared by polymerizing a mixture of monomers comprising 72 parts of butadiene and 28 parts of styrene. Homopolymers of butadiene are also operative.

In addition, the aforesaid polymers are also operable after having been partially or fully hydrogenated. A specific example of a hydrogenated polymer is Hydropol (trademark of Phillips Petroleum Company), a synthetic rubber prepared by emulsion polymerization of butadiene to polybutadiene followed by hydrogenation of the polybutadiene to the extent that it contains not over 50 percent of its original unsaturation. Such polymers are described in more detail in the application of Jones et al., Serial No. 395,291, filed November 30, 1953, now Patent No. 2,864,809, same assignee.

Blends having excellent tensile strength and freeze point characteristics can be prepared by vulcanizing blends of chlorinated polybutadiene or chlorinated Hydropol with copolymers of the type described above, either chlorinated or unchlorinated, or with natural rubber. Preferred examples include blends of chlorinated polybutadiene with butadiene-styrene, also bends of chlorinated polybutadiene with chlorinated butadiene-styrene. Blends of chlorinated Hydropol and natural rubber have utility in such applications as wire coating and white sidewall stock.

The term "butadiene polymers" when used hereinafter and in the claims will refer to both polybutadiene and copolymers of butadiene, either in simple form or hydrogenated in whole or in part.

The products prepared according to this invention are thermoplastic, not cross-linked and are soluble in such solvents as benzene, acetone, dioxane, chloroform, and carbon tetrachloride. They are insoluble in water; they are alkali and acid resistant, and non-flammable. When dissolved in suitable solvents, they can be cast into sheets and flexible films having the aforesaid properties. Such films are useful for the packaging of food products or other items and are flexible without the addition of plastizers. These polymers are compatible with alkyd and phenolic resins and can be compounded therewith for use in coating compositions and other applications enumerated below.

The lower the chlorine content, the more rubbery the polymer; those of higher chlorine content are harder, less flexible, and more resinous. Those containing 7 to 30 percent chlorine have high cured gum tensile, up to 5 to 6 times that of the parent polymer. For example, if the parent polymer had a gum tensile of 200 to 300 it will, when chlorinated to 30 percent chlorine, have a gum tensile up to 1600. Such polymers are useful in wire coating, textile coating, molded rubber, cements, etc., and can be vulcanized. In addition, the low chlorine content products prepared from partially hydrogenated polymers are compatible with rubber and can be compounded therewith for production of a variety of rubber compositions. For example, polymers containing under 30 percent chlorine can be sulfur-vulcanized to provide materials of improved tensile strength. In the case of chlorinated hydrogenated polymers (prepared from Hydropol) the vulcanized material has also an improved ozone resistance.

At 30 to 50 percent chlorine content the polymers are harder and are useful in tubing and molded articles. These products can be vulcanized, but as the residual unsaturation decreases or is entirely eliminated, it becomes necessary to use a metal oxide and an accelerator to effect vulcanization. This process is well known in the art. Oxides which are operative are those of lead, magnesium, antimony, zinc, aluminum, barium, and calcium.

From 50 to 60 percent chlorine content, the polymers are useful for anything that polyvinyl chloride can be used for, e.g., the molding of disks, cubes, knobs, handles, etc. From 50 to 70 percent chlorine content, these polymers are useful in paints, being soluble in the thinner.

EXAMPLE I

A polybutadiene rubber was prepared by the 41° F. emulsion polymerization of 1,3-butadiene according to the following recipe:

| | Parts by weight |
|---|---|
| Water | 180 |
| 1,3 butadiene | 100 |
| Santomerse No. 3 (emulsifier) | 1.25 |
| Potassium pyrophosphate | 0.177 |
| $FeSO_4 \cdot 7H_2O$ (ferrous sulfate) | 0.14 |
| Diisopropyl benzene hydroperoxide | 0.107 |
| Sulfole (tert-dodecyl mercaptan) | 0.75 |
| Shortstop (di-tert-butyl hydroquinone) | 0.2 |
| Antioxidant 2246 (2,2-methylene-bis(4-6-methyl-tert-butylphenol) | [1] 1.25 |

[1] Percent based on the weight of the polymer.

The polymerization was conducted for a period of 17 hours to a conversion of 63 percent.

20 grams of this polybutadiene rubber was dissolved in 500 ml. of carbon tetrachloride. The solution was boiled for a few minutes to remove moisture, then cooled to 10° C. after which 5 grams of phosphorus trichloride was added. A cold solution of 30 grams of chlorine in 250 ml. of carbon tetrachloride was added to this solution over a period of about 30 minutes. The reaction proceeded smoothly and there was no gelling. Toward the end of the reaction period, the product began to separate as a fine powder at the top of the solution. The product was removed on a filter and washed with isopropanol to provide a yield of 43.2 grams. The chlorinated polymer prepared in this manner was a tough resinous material, soluble in such solvents as benzene, acetone, and chloroform indicating that it was not cross-linked and had a chlorine content of 54.3 percent by weight. Analysis for phosphorus was negative.

EXAMPLE II

A batch of polybutadiene was prepared according to the following recipe:

| | | |
|---|---|---|
| Water | parts by weight | 180 |
| Butadiene | do | 100 |
| Dresinate 214 (potassium rosin soap) | do | 4.5 |
| KOH | do | 0.1 |
| Daxad 11 (Na salt of condensed alkylarylsulfonic acid) | parts by weight | 0.1 |
| KCl | do | 0.4 |
| $K_4P_2O_7$ | do | 0.127 |
| $FeSO_4 \cdot 7H_2O$ | do | 0.10 |
| Diisopropylbenzene hydroperoxide | do | 0.07 |
| Sulfole (a tert-$C_{12}$ mercaptan) | do | 0.41 |
| Shortstop:[1] Goodrite 3955 | do | 0.15 |
| Antioxidant (percent based on polymer): phenyl-beta-naphthylamine | parts by weight | 1.5 |
| Temperature | °F | 41 |
| Soap solution pH | | 10.8 |
| Time | hours | 17.7 |
| Conversion | percent | 57 |

[1] 50/50 mixture of sodium dimethyldithiocarbamate and sulfur in the form of sodium polysulfide.

A booster of one-half charge activator and oxidant was added at 14.3 hours (37 percent conversion).

A sample of 250 grams of polybutadiene rubber was dissolved in 5 liters of carbon tetrachloride. An aliquot of 500 ccs. of this solution was measured into a 1-liter 3-necked flask equipped with stirrer, thermometer, gas inlet tube, and condenser. Addition of chlorine was initiated with the flask contents at a temperature of 30° C. 35 grams of chlorine were added over a period of about 35 minutes, during which time the temperature of the reaction mixture had risen to about 60° C. Precipitation of gel was noted when about 25 grams of chlorine had been added. The entire mass was poured into isopropyl alcohol, the polymer collected, washed, and dried under vacuum. The product was insoluble in benzene and acetone, indicating that it was cross-linked. This points up the necessity of having a phosphorus halide present in the chlorination process to give a soluble product.

EXAMPLE III

A batch of polybutadiene rubber was prepared according to the following recipe:

| | | |
|---|---|---|
| Water | parts by weight | 180 |
| Butadiene | do | 100 |
| Santomerse No. 3 | do | 1.25 |
| $K_4P_2O_7$ | do | 0.177 |
| $FeSO_4 \cdot 7H_2O$ | do | 0.14 |
| KOH | do | 0.04 |
| Tert-butylisopropylbenzene hydroperoxide | do | 0.114 |
| MTM [1] | do | 0.53 |
| Shortstops: dinitrochlorobenzene | do | 0.15 |
| Antioxidant 2246 [2] | do | 1.0 |
| Polymerization temperature | °F | 41 |
| Polymerization time | hours | 15 |
| Conversion | percent | 61 |
| Mooney, ML-4 | | 25 |

[1] Blend of tertiary aliphatic mercaptans ($C_{12}$, $C_{14}$, $C_{16}$) in the ratio of 3:1:1 by weight.
[2] 2,2-methylene-bis(4-methyl-6-t-butylphenol).

Following coagulation 20 grams of this rubber were dissolved in 500 ml. of carbon tetrachloride. The solution was dried by distilling 30 ml. of solvent prior to adding catalyst. After this drying step, 80 grams of phosphorus pentachloride were added with stirring, the temperature of the system being maintained in the range of 10°–20° C. Stirring was continued overnight after which period the phosphorus pentachloride still had not disappeared. The reaction mixture was poured into isopropyl alcohol to coagulate the product which was then recovered, washed and dried in a vacuum over night at room temperature, then for one hour at 70° C. A yield of 24.25 grams of product was obtained. Based on increase in weight, this product had a chlorine content of 17.5 percent. Prior to coagulation the product was in solution but no test of solubility was made subsequent to drying. The product contained no phosphorus.

EXAMPLE IV

In order to compare catalysts a series of runs was made wherein polybutadiene was chlorinated in carbon tetrachloride with several chlorination catalysts under the conditions described in Example III. Chlorination was to the point where all the double bonds were saturated. The results of these experiments with some observations are presented in Table I.

Table I

ACTION OF VARIOUS CHLORINATION CATALYSTS AS MODIFIERS IN THE CHLORINATION OF POLYBUTADIENE

| Run No. | Catalyst (5% by Weight Based on Rubber) | Fraction of Total Chlorine Introduced at Point at Which Gelation Occurred | Benzene | Acetone |
|---|---|---|---|---|
| 1 | No catalyst | Gelation at approx. 0.14. | insol | insol. |
| 2 | Benzoyl peroxide | Gelation at approx. 0.14. | insol | insol. |
| 3 | Antimony Oxychloride. | Gelation at approx. 0.14. | insol | insol. |
| 4 | Ultra-violet radiation. | Gelation at approx. 0.07. | insol | insol. |
| 5 | Stannic Chloride | Gelation at approx. 0.23. | insol | insol. |
| 6 | Phosphorus trichloride. | No gelation | sol | sol. |
| 7 | Phosphorus Pentachloride. | do | sol | sol. |
| 8 | Phosphorus trichloride (10% based on polybutadiene). | do | sol | sol. |
| 9 | do | Gelation at 0.23 | insol | insol. |

The only catalysts which give totally soluble products (in the sense that they are non-cross-linked) are phosphorus trichloride and phosphorus pentachloride. The product prepared with 1 percent phosphorus trichloride (based on the polybutadiene) was not soluble whereas the one prepared with 5 percent phosphorus trichloride was.

All the other materials gave cross-linked products (insoluble in acetone and benzene) and the solutions gelled heavily before all the chlorine had been added. These results show, then, that phosphorus trichloride and phosphorus pentachloride have an effect on the chlorination which is different from that of the other materials generally used as catalysts. More than 1 percent (based on polymer) of phosphorus trichloride is required before soluble products result.

EXAMPLE V

A batch of butadiene/styrene rubber was prepared according to the following recipe:

| | | |
|---|---|---|
| Water | parts by weight | 180 |
| Butadiene | do | 75 |
| Styrene | do | 25 |
| Silica-free soap flakes | do | 4.7 |
| $K_2S_2O_8$ | do | 0.3 |
| Mercaptan [1] | do | 0.42 |
| Shortstop—hydroquinone | do | 0.2 |
| Antioxidant (percent based on polymer), phenyl-beta naphthylamine | do | 1.5 |
| Temperature | °F | 122 |
| Reaction time | hours | 15.6 |
| Conversion | percent | 72 |
| Mooney (ML–4): | | |
| Blowdown | | 41 |
| Final | | 42 |
| Acid | percent | 4.2 |
| Soap | do | 0.4 |
| Styrene | do | 19.5 |
| Ash | do | 0.62 |
| Inherent viscosity | | 2.02 |

[1] A 20–60–20 mixture of tert-$C_8$, $C_{12}$, and $C_{14}$ mercaptans.

100 grams of this rubber was dissolved in 4 liters of carbon tetrachloride. A vacuum was applied and a small amount of solvent boiled off to remove traces of moisture after which 25 grams of phosphorus trichloride were added. Chlorine was then passed into the stirred solution until the product was saturated after which still further chlorination was affected under ultra violet light and continued until the product gave a clear solution in carbon tetrachloride, a total of 400 grams of chlorine being added. The product was coagulated in isopropyl alcohol and recovered as a hard white powder. It was dried in a vacuum oven at 50° C. for 16 hours to provide a yield of 280 grams of material containing 64 weight percent chlorine. This chlorinated product was soluble in benzene.

EXAMPLE VI

A second batch of 75/25 butadiene/styrene was prepared in the manner described in Example V but in a 41° F. recipe, the rubber having a Mooney (ML–4) of 52±6. 100 grams of this rubber was dissolved in 2500 ml. of carbon tetrachloride. A total of 120 grams of chlorine was introduced into this solution. Gelation occurred during earlier stages of the chlorination, this gel later breaking into fine particles. The chlorinated mixture was poured into isopropanol and the product recovered as a powder. After drying overnight in a vacuum oven at 50° C., 186 grams of material containing 48.7 weight percent chlorine was obtained. This product was insoluble in benzene.

EXAMPLE VII

To evaluate a GR–S rubber which had been chlorinated to a very low level, four 250 gram samples of the butadiene/styrene rubber described in Example V were each dissolved in 3.5 liters of carbon tetrachloride. To each solution was added 25 grams of phosphorus trichloride. Four solutions of chlorine in carbon tetrachloride were prepared by dissolving 95 grams, 100 grams, 100 grams, and 100 grams of chlorine in 1-liter portions of carbon tetrachloride cooled in ice. To each of the rubber solutions was added dropwise one of the solutions of chlorine. During the addition of the chlorine solution, the temperature rose from 25° C. to about 40° C.

After the chlorination, the four batches were combined and thoroughly mixed. The combined solution was poured into sufficient isopropyl alcohol to give about a 50–50 mixture at which stage the polymer was coagulated. Antioxidant 2246 [2,2'-methylene-bis(4-methyl-6-tert-butyl phenol)] was added. After standing for 3 days in isopropyl alcohol, the product was isolated and dried in a vacuum oven at 50° C. for 16 hours to provide a yield of 1219 grams. Chlorine content of this material was 21.8 percent by weight.

Two portions of this chlorinated product were compounded and evaluated. The compounding recipe employed was as follows:

| | Parts by weight |
|---|---|
| Polymer | 100 |
| Calcined MgO (extra light) | 10 |
| Sulfur | 1.75 |
| Tetrone A [1] | 1.67 |
| Staybelite resin [2] | 2.5 |
| Zinc oxide | 1.67 |
| Titanium oxide | 0.00 and 50 |

[1] Dipentamethylene-thiuram tetrasulfide.
[2] Hydrogenated rosin.

Evaluation data were as follows:

| Sample No. | 1 | 2 |
|---|---|---|
| Filler | | TiO₂ |
| Compression set (percent) | 11.7 | 12.1 |
| 300% Modulus | 1,800 | 2,060 |
| Tensile (p.s.i.) | 1,860 | 2,060 |
| Elongation (percent) | 315 | 300 |
| Maximum Tensile (200° F.) | 450 | 790 |
| Freeze Point-TR (° C.) | −65.9 | −77.1 |
| Resilience (percent) | 45.1 | 39.3 |
| Electrical Resistivity (Megohm/cm.) | 6,520,000 | 6,640,000 |
| Shore Hardness | 80 | 91 |
| Oven Aged 24 Hours at 212° F.: | | |
| Tensile (p.s.i.) | 2,240 | 2,300 |
| Elongation (percent) | 265 | 270 |
| Resilience (percent) | 45.0 | 43.6 |

EXAMPLE VIII

A batch of polybutadiene rubber was prepared according to the following recipe:

| | | |
|---|---|---|
| Water | parts by weight | 180 |
| Butadiene | do | 100 |
| Santomerse #3 | do | 1.25 |
| Potassium hydroxide | do | 0.05 |
| K₄P₂O₇ | do | 0.165 |
| FeSO₄·7H₂O | do | 0.139 |
| Diisopropylbenzene hydroperoxide | do | 0.107 |
| Benzene | do | 0.4 |
| Sulfole | do | 0.80 |
| Polymerization temperature | ° F | 41 |
| Polymerization time | hours | 26 |
| Conversion | percent | 44 |
| Mooney, ML-4 | | 26 |
| Shortstop: Dinitrochlorobenzene | part | 0.2 |
| Antioxidant: Polygard [1] | | 1.0 |

[1] Mixed alkyl phenyl phosphites.

Coagulation was effected with isopropanol (2 volumes per volume latex). The polymer was washed three times with water and dried for 24 hours in a vacuum oven at 150° F.

A sample of Hydropol was prepared by dissolving 650 grams of this rubber in 10 liters of methylcyclohexane and hydrogenating this solution at a temperature of 400° F. under a pressure of 500 p.s.i.g. using 30 percent by weight (based on rubber) of nickel-kieselguhr catalyst. The hydrogenation was continued for three hours after reaching reaction temperature. Catalyst was removed from the solution by magnetic separation and recovery of the hydrogenated polymer made by drum drying. Unsaturation of the product was 16.3 percent, as determined by iodine monochloride method described in J. Polymer Science, III, 66–84 (1948).

A second sample of Hydropol was made from the rubber described above. The hydrogenation procedure was identical with that just described except that the amount of catalyst employed was 25 percent by weight based on the rubber. The product had an unsaturation of 20.5 percent.

In the preparation of both samples, after removal of the catalyst and prior to drum drying, the solution was treated with acetic acid as a bleach. According to this procedure, to 10 liters of methylcyclohexane solution was added a solution of 10 ml. glacial acetic acid and 10 ml. of water in 90 ml. methylcyclohexane. The mixture was heated in the range 150° to 180° F. with stirring for 20 minutes after which the solution was transferred to the drum dryer.

A blend of the 2 Hydropols with an average unsaturation of 18.7 percent was prepared. 681 grams of this Hydropol were dissolved in 75 liters of carbon tetrachloride using 60 grams of phosphorus trichloride as catalyst, chlorine was passed in slowly until 180 grams had been introduced (20 grams in excess of that required to saturate the residual double bonds). The reaction mixture was poured into isopropyl alcohol for coagulation. The polymer was recovered, washed and dried to provide a yield of 800 grams. The dried product had a chlorine content of 15.7 percent and was soluble in benzene and chloroform indicating that it was not cross-linked.

EXAMPLE IX

Three batch hydrogenations were run on a polybutadiene prepared according to the recipe of Example II. In each run, 650 grams of rubber were dissolved in 10 liters of methylcyclohexane and charged to the hydrogenator, nickel-kieselguhr catalyst added, the system pressured with hydrogen to 500 p.s.i.g. and the temperature elevated to the operating range. After three hours the hydrogenation was terminated, the catalyst removed by magnetic separation and the hydrogenated product recovered by drum drying. Operating variables, unsaturation, etc., are tabulated below.

| Run | Wt. Percent Catalyst (Based on Rubber) | Temperature, (° F.) | Unsaturation (Percent) |
|---|---|---|---|
| A | 15.5 | 500 | 11.4 |
| B | 12.0 | 350 | 31.8 |
| C | 18.0 | 350 | 23.2 |

These 3 Hydropols, hereafter referred to as A, B, and C, were chlorinated for further evaluation. In each run a weighed portion of Hydropol was dissolved in 4 liters of carbon tetrachloride and the solution charged to the chlorination reactor. 25 grams of phosphorus trichloride were added. Gaseous chlorine was introduced into the stirred solution. After addition of the chlorine the reaction mixture was allowed to stand in contact with reacted chlorine for several hours. The product was coagulated with isopropyl alcohol, washed, and dried in a vacuum oven. Operating variables, yields, etc., are tabulated below.

| Run No. | Hydropol | Wt. Hydropol Charged (gm.) | Chlorine (gm.) | Standing Time [1] | Yield, (gr.) | Percent Chlorine (by analysis) |
|---|---|---|---|---|---|---|
| 1 | A | 400 | | Over night | 425 | 13 |
| 2 | B | 315 | 190+ | Weekend | 442.5 | 30 |
| 3 | C | 350 | 115 | Over night | 450 | 25 |

[1] Standing time-period that chlorination mixture was allowed to stand in contact with chlorine before coagulation.

The unvulcanized chlorinated Hydropols from the foregoing runs A, B, and C, were evaluated along with samples of the unchlorinated materials, hereafter referred to as $A_x$, $B_x$, and $C_x$. Evaluation data are tabulated below.

| Number | $A_x$ | A | $B_x$ | B | $C_x$ | C |
|---|---|---|---|---|---|---|
| Tensile | 1,090 | 1,210 | 1,360 | 1,080 | 730 | 1,150 |
| Elongation (Percent) | 875 | 800 | 810 | 200 | 675 | 290 |
| Flex Temp. (F.) | −75 | −61 | −100 | −36 | −95 | −42 |
| Swell (Vol. Percent) | 120 | 246 | 172 | 116 | 116.4 | 107 |
| Softening Point (F.) | 162 | 163 | 162 | 166 | 165 | 165 |
| Shore Hardness (2A) | 84 | 77 | 76 | 90 | 79 | 92 |
| Chlorine (Percent) | | 13 | | 30 | | 25 |

EXAMPLE X

Six solid polybutadiene polymers were hydrogenated in the manner described in Examples VII and VIII to the degree of unsaturation indicated in column 3 of Table II below. These hydrogenated polymers were then chlorinated in the manner of Example VII, using phosphorus trichloride as the catalyst, the extent of chlorination being shown in column 4 of Table II. The chlorinated polymers used in runs 1–3 were compounded using Kalite as a filler according to the following recipe:

| Material: | Parts by weight |
|---|---|
| Elastomer | 100 |
| Staybelite resin [1] | 2.5 |
| Kalite [2] | 80 |
| MgO | 20 |
| Tetrone A [3] | 1 |

[1] Hydrogenated rosin.
[2] Calcium carbonate.
[3] Dipentamethylene-thiuram tetrasulfide.

The chlorinated polymers used in the last three runs of Table II in which the filler was Wyex and litharge were compounded according to the following recipe:

| Material: | Parts by weight |
|---|---|
| Elastomer | 100 |
| Wood rosin WG [1] | 10 |
| Wyex [2] | 40 |
| Litharge (lead oxide) | 40 |
| Captax [3] | 3 |

[1] Pale straw color wood rosin.
[2] Channel carbon black.
[3] Mercaptobenzothiazole.

In both groups the compounded ingredients were milled and cured for 45 minutes at 307° F. Physical properties are listed in Table II below:

in this test indicates no attack by ozone, a value of 1 indicates a slight dulling of the surface, and a value of 2 denotes the first evidence of ozone attack, a slight "bubbly" appearance on the surface of the rubber. Progressively higher numbers indicate progressively greater disintegration and cracking of the rubber, the maximum value of 10 meaning that the sample contains numerous deep cracks and is substantially disintegrated. On this scale it is clear from Table II that the chlorinated Hydropol of the present invention is outstanding in its resistence to ozone attack.

EXAMPLE XI

A polymer blend (sample A) was made up using 50 parts by weight of a chlorinated polybutadiene and 50 parts by weight of butadiene-styrene. The polybutadiene was prepared according to the recipe of Example I and chlorinated in the manner of that example to the point where it contained 30.2 percent by weight of chlorine. The butadiene-styrene was prepared by the process described in Example V. The two polymers were mixed and cold-milled until blended (about 10 minutes) after which compounding ingredients were added on the mill in the following order and ratio in parts by weight:

| | Parts by weight |
|---|---|
| Magnesium oxide (light calcined) | 10 |
| Zinc oxide | 1.5 |
| Staybelite resin | 2.5 |
| Sulfur | 1.5 |
| Tetrone A | 1.5 |

A compounded composition was vulcanized by curing for 75 minutes at 150° C.

A second polymer blend (sample B) was prepared in the general manner described above but with the addition

Table II
EVALUATION OF VULCANIZED CHLORINATED HYDROPOL

| Run No. | Elastomer | Percent Unsat. | Percent Cl | Filler | 80° F. | | | | 200° F. Tensile | Shore Hardness | Compression Set | | | Gehman Freeze Pt., °C. | Swelled,[1] Percent | Extracted[1] | Ozone Rating |
|---|---|---|---|---|---|---|---|---|---|---|---|---|---|---|---|---|---|
| | | | | | 200% Modulus | 300% Modulus | Tensile, p.s.i. | Elongation Percent | | | 2 Hrs. at 212°F., Percent | 22 Hrs. at 35° F. | | | | | |
| | | | | | | | | | | | | Relaxed 10 Sec. | Relaxed 30 Min. | | | | |
| 1 | Hydropol | 26 | 25 | Kalite | | | | | | 82 | 11.1 | 95.6 | 95.6 | −18 | 121.3 | 4.2 | 0 |
| 2 | Hydropol B-121 | 18 | 10 | Kalite | 1,080 | | 1,230 | 375 | 100 | 86.5 | 15.6 | 93.5 | 91.8 | −47 | 86.3 | 0.9 | 0 |
| 3 | Hydropol B-121 | 18 | 20 | Kalite | 1,350 | | 1,370 | 245 | 100 | 89 | 21.1 | 95.4 | 93.9 | −42 | 77.1 | 8.9 | 1 |
| 4 | Hydropol | 26 | 25 | Wyex and Litharge | | | 2,350 | 125 | 1,200 | 88 | 2.3 | 94.7 | 94.7 | −22 | 101.9 | 4.7 | 0 |
| 5 | Hydropol | 18 | 10 | Wyex and Litharge | 1,480 | | 1,650 | 250 | 110 | 85 | 14.1 | 92.3 | 91.5 | −48 | 91.5 | 4.1 | 2 |
| 6 | Hydropol | 18 | 20 | Wyex and Litharge | | | 2,850 | 160 | 290 | 91 | 8.1 | 91.2 | 91.0 | −37 | 70.1 | 2.4 | 1 |

[1] Swell was determined in a 70/30 isooctane/toluene extraction solution, extraction being conducted for 7 days at 80° F.

Perhaps the most outstanding properties brought out by Table II are the Gehman freeze point and the ozone rating. The Gehman freeze point is the temperature at which rubber "freezes," i.e., goes through a phase change from a plastic to a brittle state. This is determined by the Gehman torsional apparatus described in ASTM Standards on Rubber Products, December 1952 edtion, pages 547–553 (ASTM Description: D-1053–52T). A rubber with low Gehman freeze point such as shown in Table II is useful as low temperatures; for example, under arctic conditions or at high altitudes.

The ozone rating is a measure of the ozone resistance, the details of this test being detailed in copending application Serial No. 257,193, filed November 19, 1951, same assignee. Briefly, it comprises exposing ½″ x 3″ strips of the rubber, extended by 25%, to an ozone concentration of 40–50 parts/million for 48 hours. A value of 0 of Philblack O (a high abrasion furnace black). A 50/50 mixture, in parts by weight, of the chlorinated polybutadiene and butadiene-styrene (prepared as described for sample A) were blended by cold-milling for about 10 minutes after which compounding ingredients were added on the mill in the following order and proportions:

| | Parts by weight |
|---|---|
| Stearic acid | 2.5 |
| Philblack O | 50 |
| Magnesium oxide (light calcined) | 10 |
| Zinc oxide | 1.5 |
| Sulfur | 1.5 |
| Tetrone A | 1.5 |

The compound mixture was cured for 70 minutes at 307° F.

A third blend (sample C) was prepared using a 50/50 mixture, in parts by weight, of the polybutadiene described above (sample A) and chlorinated butadiene-styrene prepared according to the recipe and process of Example IV but chlorinated to the point where it contained 6 percent by weight of chlorine. The polymers were blended by cold-milling for 10 minutes after which compounding ingredients were added on the mill in the following order and proportions:

|  | Parts by weight |
|---|---|
| Pentaryl A [1] | 3.0 |
| McNamee Clay [2] | 72 |
| Staybelite resin | 2.5 |
| Zinc oxide | 1.5 |
| Sulfur | 1.5 |
| Tetrone A | 1.5 |

[1] Amylbiphenyl.
[2] White kaolin filler.

This composition was vulcanized by curing for 1 hour at 307° F.

As a control butadiene-styrene, prepared as in Example IV, was compounded according to the following recipe:

|  | Parts by weight |
|---|---|
| Butadiene-styrene | 60 |
| Magnesium oxide (light calcined) | 6 |
| Sulfur | 1 |
| Tetrone A | 1 |
| Staybelite resin | 1.5 |
| Zinc oxide | 1 |

This composition was milled and cured in the manner described for sample C.

The four samples were then compared as to tensile strength and freeze point. The results are shown in Table III below.

*Table III*

| Polymer | 80° F., p.s.i. at— | | | | $E_{Br}$[1] | 200° F., p.s.i. at— | | | | $E_{Br}$[1] | Freeze Pt. |
|---|---|---|---|---|---|---|---|---|---|---|---|
|  | 100% | 200 | 300 | Break |  | 100% | 200 | 300 | Break |  |  |
| Sample A | | | | 790 | 230 | 400 | | | 590 | 140 | −67C |
| Sample B | 1,380 | | | 1,970 | 165 | 580 | | | 1,050 | 160 | |
| Sample C | 830 | | | 1,050 | 190 | 450 | | | 620 | 190 | |
| Sample D (Control) | | | | 220 | 240 | 100 | | | 110 | 110 | |

[1] Percent elongation at break point.

The above table demonstrates the superior tensile strength of the chlorine-containing blends over the unchlorinated butadiene-styrene control.

EXAMPLE XII

In order to evaluate the utility of chlorinated Hydropol in a white sidewall stock, a portion of the chlorinated Hydropol blend described in Example VIII was prepared with pale crepe according to the following formulation:

|  | |
|---|---|
| Chlorinated Hydropol | 50 |
| Pale crepe | 50 |
| Staybelite resin | 1.25 |
| Stearic acid | 0.25 |
| Titanium dioxide | 50 |
| Extra light calcined MgO | 12.5 |
| Agerite Alba [1] | 1.0 |
| Sulfur | 1.5 |
| Thiuram M [2] | 0.2 |
| Altax [3] | 2.25 |

[1] Hydroquinone monobenzyl ether.
[2] Tetramethyl thiuram disulfide.
[3] Benzothiozyl disulfide.

The physical properties of two samples of the material prepared according to the above formulation are summarized below:

|  | Sample 1 | Sample 2 |
|---|---|---|
| Minutes Cure @ 320° F | 20 | 45 |
| Compression set (percent) | 22.3 | 16.0 |
| Tensile (p.s.i.) @ 80° F | 1,040 | 890 |
| Elongation (percent) @ 80° F | 255 | 220 |
| Flex Life (M)[1] | | 0.2 |
| Shore Hardness on Demattia Slab | | 56.5 |
| Shore Hardness on Compression Set Pellet | 59.5 | 58.5 |
| Ozone Resistance (Rating) | 0 | |
| Flex Life after Oven Aging [2] | | 0.2 |
| Shore Hardness after Oven Aging [2] | | 55.5 |
| Tensile (p.s.i.) after Oven Aging [2] | 820 | 730 |
| Elongation (percent) after Oven Aging [2] | 160 | 110 |
| Shore Hardness on Compression Set Pellet after Oven Aging [2] | 56 | 57 |

[1] M—thousands of flexes till break.
[2] Oven Aging—7 days at 212° F., then tested at 80° F.

The foregoing example shows that chlorinated Hydropol imparts its excellent ozone resistance to a pale crepe blend and that even after aging 7 days at 212° F., the deterioration of its physical properties does not seriously affect its utility for sidewall stock.

It is not intended that the invention be limited to any of the specific examples nor to any theories as to the operation of the invention. Suitable changes may be made in the details of the process, compounding recipes, etc., without departing from the spirit of the present invention.

We claim:

1. The process of chlorinating a rubbery butadiene polymer comprising reacting the polymer under anhydrous conditions with elemental chlorine in carbon tetrachloride at a temperature of about 5–80° C. and in the presence of over 1 percent but not over 25 percent by weight of a catalyst based on the weight of the polymer, said catalyst being selected from the group consisting of phosphorus trichloride and phosphorus pentachloride, and recovering a thermoplastic chlorinated polymer which is soluble in conventional organic solvents.

2. Process of claim 1 wherein the rubbery polymer is a copolymer of 1,3-butadiene and a compound selected from the group consisting of chloroprene, isoprene, styrene, and alpha-methyl-styrene.

3. Process of claim 1 wherein the rubbery polymer is a homopolymer of 1,3-butadiene.

4. The process of chlorinating a rubbery butadiene-styrene copolymer comprising dissolving said copolymer in carbon tetrachloride and treating it with elemental chlorine under anhydrous conditions in the presence of a phosphorus halide catalyst selected from the group consisting of phosphorus trichloride and phosphorus pentachloride at a temperature of about 10°–30° C., thereby affecting chlorination of the unsaturated linkages, continuing the chlorination in the presence of iodine to effect substitutive chlorination, coagulating the chlorinated polymer to facilitate its recovery, and washing and drying the recovered product.

5. Process of claim 4 wherein coagulation is effected by pouring the reaction mixture into a liquid selected from the group consisting of isopropanol and hot water.

6. An improved process of preparing a chlorinated butadiene polymer which is not cross-linked comprising dissolving in carbon tetrachloride a rubbery polybutadiene which has been hydrogenated to a point where it contains not over 50 percent of its original unsaturated and chlorinating the dissolved polymer at a temperature in the range of 5 to 80° C. under anhydrous conditions with elemental chlorine in the presence of over 1 percent but not over 25 percent by weight based on the weight of the polymer of a catalyst selected from the group consisting of phosphorus trichloride, and phosphorus pentachloride.

7. Process for chlorinating a rubbery butadiene polymer comprising contacting said polymer at a temperature in the range of 5–80° C. under anhydrous conditions with elemental chlorine in carbon tetrachloride and in the presence of a phosphorus halide catalyst selected from the group consisting of phosphorus trichloride and phosphorus pentachloride until the unsaturated linkages are chlorinated, further continuing the chlorination by subjecting the chlorinated butadiene polymeric mixture to a reaction promoting agent selected from the group consisting of benzoyl, peroxide, iodine, stannic chloride, and antimony oxychloride to effect substitution of at least a portion of the hydrogen atoms in the polymer by chlorine atoms.

8. Process of claim 7 wherein the chlorinated product is coagulated to facilitate its recovery from the reaction solution.

9. An improved process of preparing a chlorinated butadiene polymer comprising dissolving in carbon tetrachloride a rubbery polybutadiene which has been hydrogenated to a point where it contains about 20 percent of its original unsaturation, chlorinating the dissolved polymer at a temperature in a range of 5–80° C. under anhydrous conditions with elemental chlorine in the presence of over 1 percent but not over 25 percent by weight of phosphorus trichloride based on the weight of the polymer, pouring the reaction mixture into a coagulant selected of the group consisting of hot water and isopropanol to coagulate the polymer and recovering the coagulated polymer product.

References Cited in the file of this patent

UNITED STATES PATENTS

| | | |
|---|---|---|
| 2,066,331 | Carothers et al. | Jan. 5, 1937 |
| 2,143,470 | Becker et al. | Jan. 10, 1939 |
| 2,386,968 | Martin | Oct. 16, 1945 |
| 2,389,460 | Rinehart | Nov. 20, 1945 |
| 2,525,155 | Thynne et al. | Oct. 10, 1950 |
| 2,581,927 | Briant | Jan. 8, 1952 |
| 2,732,354 | Morrissey et al. | Jan. 24, 1956 |
| 2,834,749 | Salyer et al. | May 13, 1958 |

OTHER REFERENCES

Schildknecht: "Vinyl and Related Polymers," Wiley & Sons (New York), 1952, page 89.